INVENTOR.
THOMAS L. FAWICK
BY Willard D. Eakin
ATTORNEY

Patented Jan. 20, 1953

2,626,031

UNITED STATES PATENT OFFICE 2,626,031

FLUID CLUTCH WITH SLIDABLE BEARING

Thomas L. Fawick, Cleveland, Ohio, assignor to The Fawick Airflex Company, Inc., a corporation of Indiana Application June 11, 1949, Serial No. 98,537

6 Claims. (Cl. 192—88)

This invention relates to a clutch assembly and especially to a power take-off assembly comprising a clutch.

Its chief objects are to provide a take-off assembly of short axial length, for economy of space and for avoidance of excessive side-draft on the assembly; to provide conveniently and with certainty, in the use of a disc-type pneumatic clutch such as is described and more broadly claimed in my U. S. Patent No. 2,307,456 or No. 2,439,849, for equal division of the clutch load between two pairs of mating friction clutch faces; thus to provide against clutch-engaging force being sustained as an excessive thrust upon the crank-shaft of the motor in the case of a power take-off embodying my invention; to provide simplicity and economy of construction and assembly; and to provide, in an assembly of this type, the flexible-coupling effect that is a feature of the clutches of my above mentioned patents.

Figure 1:
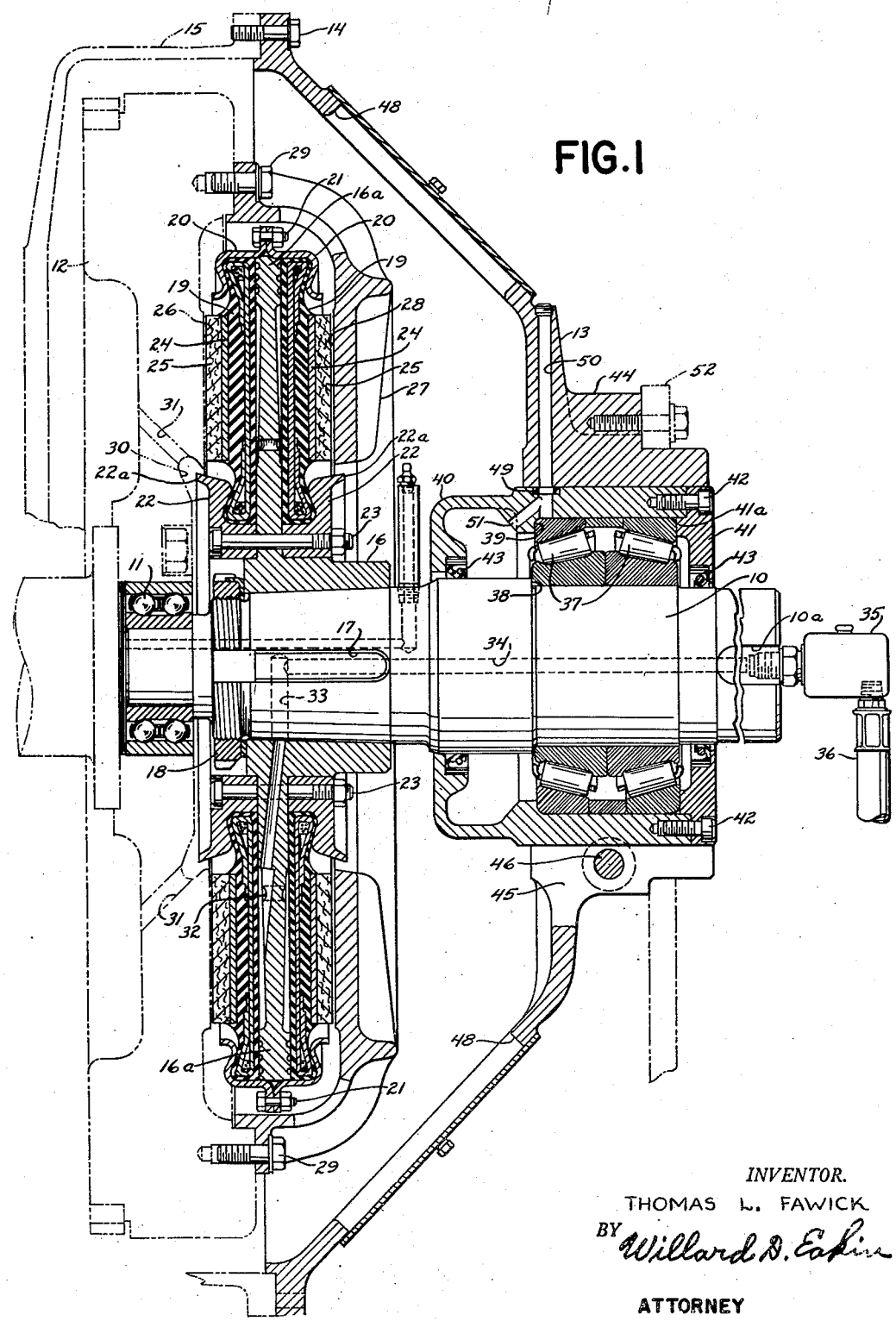
Fig. 1 is an axial section of a power take-off assembly embodying my invention in its preferred form.

In the embodiment shown in the accompanying drawings a driven shaft 10, provided at its outer end with a key 10ª for the securing of a belt-pulley or sprocket or the like thereon, has an inner end portion of small diameter which is axially slidable in the inner race of an anti-friction pilot bearing 11 mounted in a central recess in the hub of the fly-wheel 12 of the motor.

Near its outer end the driven shaft 10 is journaled, by a bearing assembly to be more fully described hereinafter, in a conical clutch housing 13 which is secured by bolts 14 to the housing 15 of the motor. The two housings are referred to in the appended claims as a frame structure.

A clutch interposed between the fly-wheel 12 and the driven shaft 10 comprises a clutch-hub member 16 secured upon a tapered portion of the shaft, by means of a key 17 and a lock-nut 18, and formed with an axially thin and radially extensive disc-like portion 16ª which serves as a mounting for a pair of flexible annular diaphragms 19, 19 which are sealingly clamped to it, at their outer margins, by a pair of clamping rings 20, 20 drawn together by bolts 21, 21, and at their inner margins by clamping rings 22, 22 drawn together by bolts 23, 23 extending through holes in the disc-like portion of the member 16.

The diaphragms 19 preferably are of cord-reinforced rubber, as shown, and vulcanized to the outer face of each of them is an annular metal plate 24 having secured to its outer face a disc-like ring 25 of wear-resisting, frictional, clutch-facing material.

For frictional engagement by one of the clutch-facings 25 the fly-wheel 12 is suitably formed with a smooth and flat annular face 26. For frictional engagement by the other one of the clutch facings 25 a metal ring 27, formed with a smooth and flat face 28, is of dished form at its outer margin and is there secured to the fly-wheel by bolts 29, 29.

To prevent oil from reaching the friction faces of the clutch the clamping rings 22, 22 can be formed at their outer margins with respective oblique oil-throwing lips 22ª, 22ª. One of them is thus adapted to divert oil into an annular groove 30 formed in the adjacent face of the fly-wheel and in communication with holes 31, 31 extending obliquely through the fly-wheel. The other one of the clamping ring 22, by reason of its oblique lip 22ª, is adapted to divert oil to the exterior face of the friction ring 27 of the clutch.

For distending the diaphragms, for clutch engagement, the disc-like portion of their mounting, 16ª, is suitably drilled, as shown, to provide communication of annular grooves 32, 32 in its opposite faces with a transverse hole 33 in the shaft 10 which communicates with an axial bore 34 extending from the outer end of the shaft, where a rotary seal 35 is provided for charging and venting the inter-diaphragm space of the clutch through a non-rotating hose 36 leading from a suitable source of pressure fluid and provided with a suitable control valve, not shown.

The bearing assembly by which the driven shaft 10 is journaled in the clutch-housing member 13 comprises a double-conical radial-and-thrust, roller bearing 37 of which the two inner races are fitted on the shaft in stacked relation against a shoulder 38 on the shaft. The two outer races are held stacked, with an intervening spacer 37ª, against a shoulder 39 in a bearing-seat ring 40, the means for so holding them being a closure ring 41 drawn toward the seating ring 40 by bolts 42, 42 and having a centering and clamping flange 41ª fitting within the seating ring and clampingly abutting the adjacent one of the outer races of the bearing.

The bearing assembly comprising the seating ring 40 and the closure ring 41 is thus firmly positioned upon the shaft by the shoulder 38.

Oil seals 43, 43 can be mounted between the members 40 and 41 respectively and the shaft 10.

The bearing assembly just described, including the seating rings 40 and the closure ring 41, is mounted in an apertured central boss 44 formed on the conical clutch-housing member 13. This boss is radially slotted, as at 45, for a suitable distance outward from its inner periphery, and its inner diameter is such that initially the seating ring 40 of the bearing assembly is freely slidable in it, but such that the seating ring 40 can be securely clamped at a fixed position in it by tightening a large clamping bolt 46 extending through ears 47, 47 projecting from it (Fig. 2) at opposite sides of the slot 45.

In assembling the structure the clutch parts, including the friction ring 27, and the large bearing assembly described, are preliminarily mounted upon the shaft 10 and the conical clutch housing member 13 is loosely associated with the seating ring 40 of the large bearing. This sub-assembly is then presented to the fly-wheel and motor housing, the small end of the shaft 10 entering the inner race of the pilot bearing, and the clutch housing is secured to the motor housing by the bolts 14. The friction ring 27 is then bolted to the fly-wheel, openings 48, 48 in the clutch housing providing access for that purpose.

Pressure fluid is then admitted to the clutch, through the shaft 10, to distend the diaphragms and, with equal pressure against the two, force the wear plates 25, 25 respectively against the friction face of the fly-wheel and that of the friction ring 27. This causes the disc-like mounting 16ª of the diaphragms, and with it the shaft 10 and the seating ring 40 of the large bearing, to take positions axially of the assembly suitable for equalization of clutch-engagement pressure between the two pairs of friction faces in subsequent engagements of the clutch, and they are then held in those positions by tightening of the large clamping bolt 46.

Such equalization of pressures, for further operation, is thus provided in spite of such slight inaccuracies of dimensions, or different flexibilities of the diaphragms, as may exist.

Suitable provision can be made, as shown, for supplying oil to the pilot bearing 11, and for supplying oil to the large bearing at whatever position its seating member 40 may have assumed in the boss 14, the outer face of the seating member is formed with recess 49 of sufficient width, axially of the assembly, to be sure to be in communication with an oil hole 50 in the boss, and being in communication, through a bore 51, with the interior of the seating ring.

An outboard support 52 can be provided, but is optional, because the entire take-off assembly can be of small dimension axially, so that neither its weight nor the power load has excessive leverage or side-draft.

Figure 3:
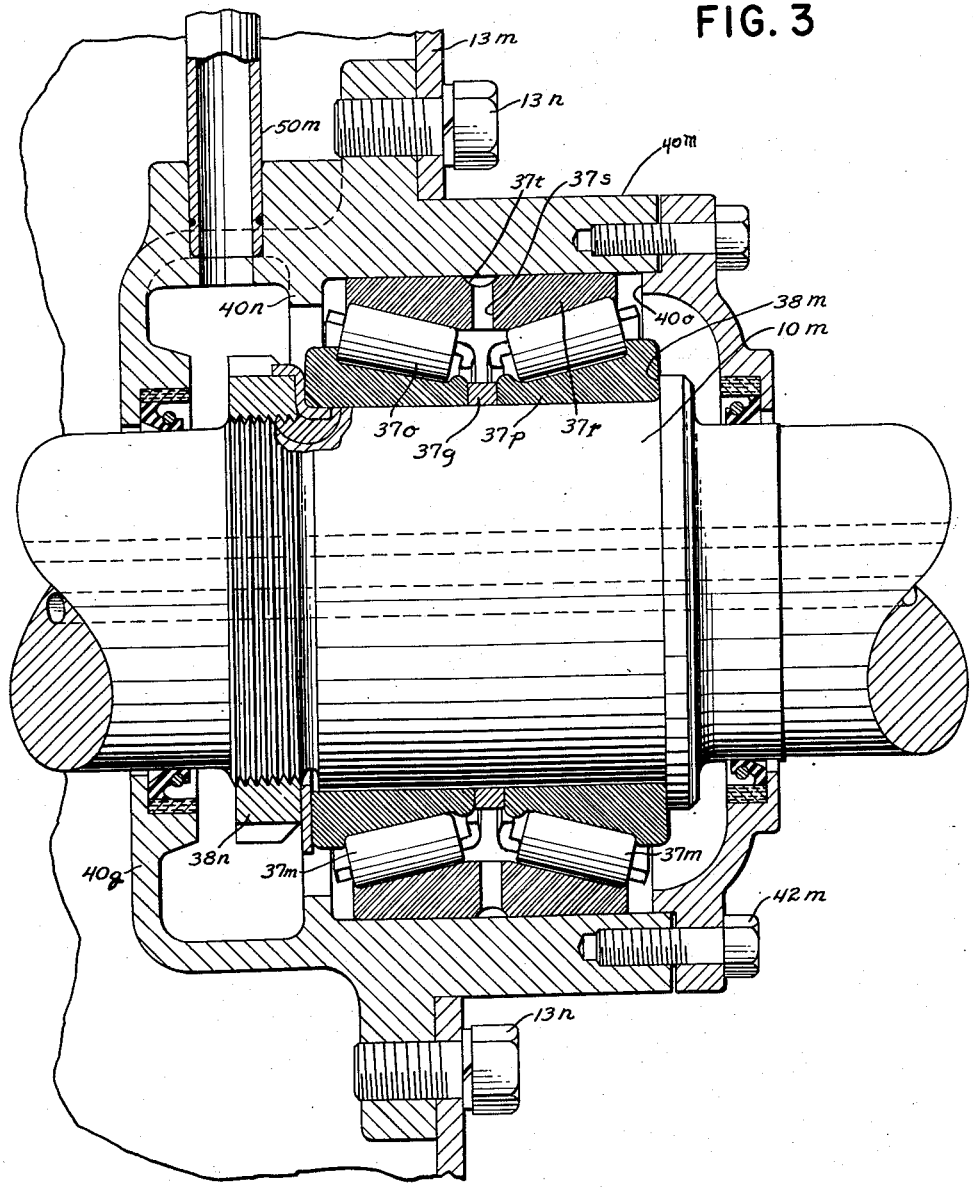
Fig. 3 is a fragmentary axial section of a modification.

In the modification shown in Fig. 3, the driven shaft, 10$^m$, is formed with an annular shoulder 38$^m$ and provided with a locking nut 38$^n$ for holding between them the inner races 37$^o$ and 37$^p$, and a spacer ring 37$^q$, of an anti-friction bearing 37$^m$, here shown as a double, outwardly flared, conical roller bearing, of which a single ring 37$^r$ provides the outer races for the two sets of rollers.

This outer race ring 37$^r$ is slidably mounted in a seating member 40$^m$ and is of less axial dimension than the space between an internal flange 40$^n$ of the seating member and a shoulder 40$^o$ of an end-closure ring 40$^p$ secured to the seating member by bolts 42$^m$, 42$^m$. At its other end the seating member 40$^m$ is formed with an end-closure flange 40$^q$. Oil seals 43$^m$, 43$^m$ are provided respectively between this end-closure flange 40$^q$ and the shaft and between the end-closure ring 40$^p$ and the shaft, so that the bearing and its races are enclosed in a sealed oil chamber.

In this embodiment, the seating member 40$^m$ for the bearing is fixedly secured to the clutch housing, 13$^m$, by bolts 13$^n$, 13$^n$; an oil pipe 50$^m$ extends into the housing from its exterior and is coupled to a hole in the seating member 40$^m$, for supplying oil to the chamber containing the bearing, and the outer race ring 37$^r$ of the bearing is formed with radial holes such as the hole 37$^s$ and with an annular groove 37$^t$ on its outer face for conveying some of the oil to that face for free axial sliding of the race ring 37$^r$ in the seating member 40$^m$.

Figure 2:
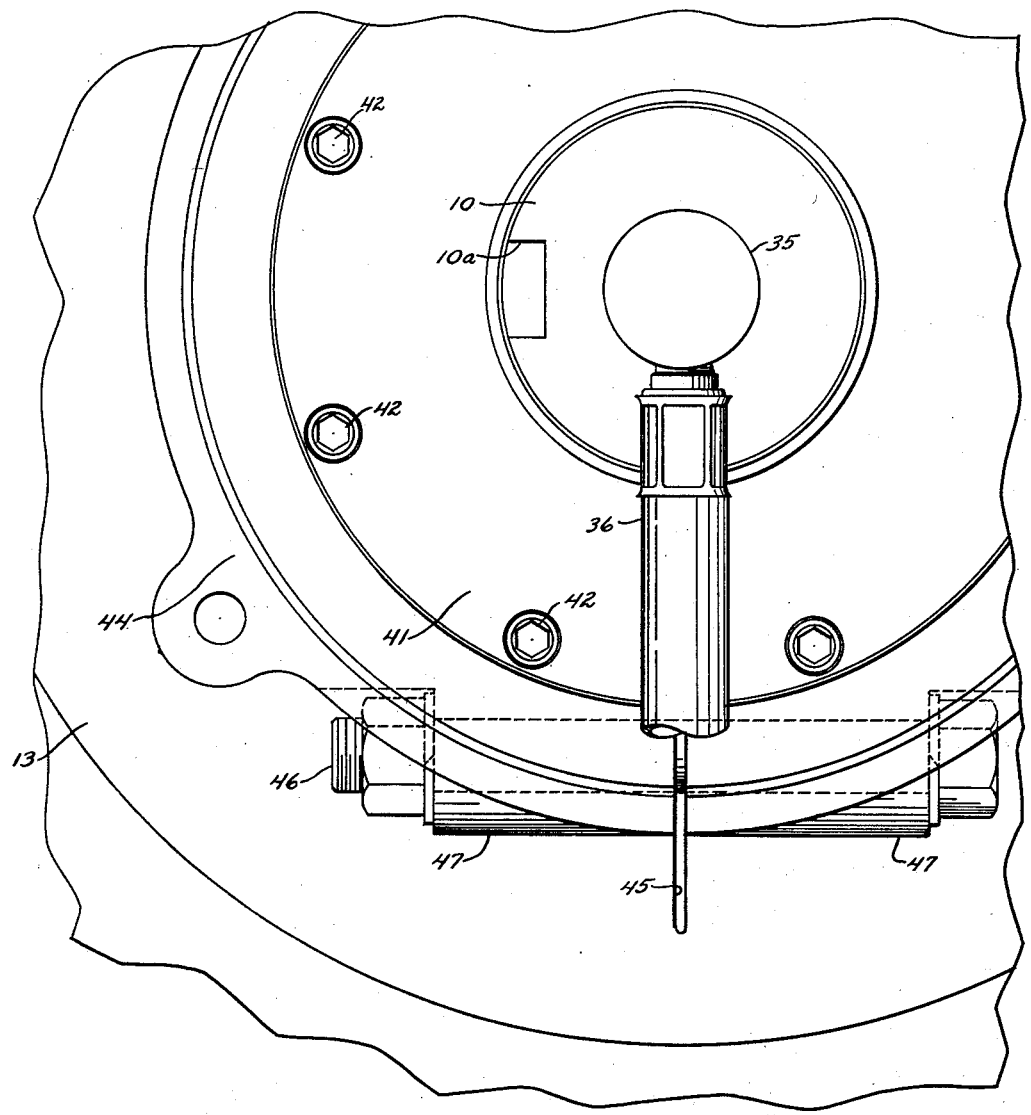
Fig. 2 is a fragmentary end elevation of the same, from the right of Fig. 1.

In this construction, as in the embodiment shown in Figs. 1 and 2, the bearing, being in a sealed chamber, is well protected from dirt and is well lubricated, and axial slippage of the bearing, along with the shaft 10$^m$, permits the two engagement pressures in the clutch substantially to equalize when the sprocket, gear or belt mounted on the shaft 10$^m$ exerts little or no thrust upon the shaft. Also, in the case of substantial thrust upon the shaft 10$^m$, the two diaphragms, being in what may be called a balanced condition in the absence of such thrust, act somewhat as a single unit in cushioning the thrust and thus protecting the bearings of the motor crank-shaft to which they transmit it, their action as a unit being somewhat analogous to the action of the two side-walls of a tire, as a unit, in cushioning side-sway of an automobile on a curve.

Further modifications are possible without departure from the scope of the invention as defined by the appended claims.

I claim:

1. A clutch assembly comprising a frame structure, two axially aligned shafts having journaled relation to said frame structure and having their adjacent ends presented to each other, a rigid clutch element mounted on one of the shafts and having two axially and oppositely facing friction surfaces, at a fixed distance from each other, for clutch engagement, a rigid clutch element mounted on the other shaft and having mounted thereon two diaphragms axially distensible for engaging respectively the said friction surfaces, and means for distending and relaxing the diaphragms, one of the said rigid clutch elements being, at least on occasion, axially slidable with relation to the other rigid clutch element to permit the engagement pressure of each of the diaphagms to be at least chiefly sustained by the other diaphragm.

2. A clutch assembly comprising a frame structure, two axially aligned shafts having journaled relation to said frame structure and having their adjacent ends presented to each other, a rigid clutch element mounted on one of the shafts and having a pair of axially and oppositely facing friction surfaces for clutch engagement, and a rigid clutch element mounted on the other shaft and having mounted thereon a pair of diaphragm elements oppositely distensible, axially of the assembly, for effecting driving engagement of said friction surfaces, one of the said rigid clutch elements being, at least on occasion, axially slidable with relation to the other rigid clutch element to permit the engagement pressures of the diaphragm elements to be chiefly sustained by each other, the said friction surfaces being of substantially plane form and said diaphragm elements having torque-sustaining portions that are flexible for compensating shaft mis-alignment.

3. A clutch assembly comprising a frame structure, two axially aligned shafts having journaled relation to said frame structure and having their adjacent ends presented to each other, a rigid clutch element mounted on one of the shafts and having a pair of axially and oppositely facing friction surfaces, at a fixed distance from each other, for clutch engagement, a rigid clutch element mounted on the other shaft and having mounted thereon a pair of friction elements axially movable with relation to each other for engaging respectively the said friction surfaces, and means for so moving them, the assembly including a bearing assembly interposed operatively between the frame structure and the shaft of one of the rigid clutch elements and having a fixed position axially of one of the two rigid clutch elements, and means for holding the bearing assembly in axially slidable but centered relation to the other one of said rigid clutch elements, the bearing assembly including a bearing-enclosing structure and oil seals between it and a relatively rotating member.

4. A clutch assembly comprising a frame structure, two axially aligned shafts having journaled relation to said frame structure and having their adjacent ends presented to each other, a rigid clutch element mounted on one of the shafts and having a pair of axially and oppositely facing friction surfaces for clutch engagement, and a rigid clutch element mounted on the other shaft and having mounted thereon a pair of fluid-distensible elements oppositely distensible, axially of the assembly, for effecting driving engagement of said friction surfaces, the assembly including a bearing assembly interposed operatively between the frame structure and the shaft of one of the rigid clutch elements and means for holding the bearing assembly in axially slidable but centered relation to the other of said rigid clutch elements, the bearing assembly including a bearing-enclosing structure and oil-seals interposed between it and a relatively rotating member.

5. A clutch assembly comprising a frame structure, two axially aligned shafts having journaled relation to said frame structure and having their adjacent ends presented to each other, a rigid clutch element mounted on one of the shafts and having a pair of axially and oppositely facing friction surfaces for clutch engagement, and a rigid clutch element mounted on the other shaft and having mounted thereon a pair of fluid-distensible elements oppositely distensible, axially of the assembly, for effecting driving engagement of said friction surfaces, the assembly including a bearing assembly interposed operatively between the frame structure and the shaft of one of the rigid clutch elements and having a fixed position axially of one of the said rigid clutch elements, and means for holding the bearing assembly in axially slidable but centered relation to, and, alternatively, in fixed position axially of, the other of said rigid clutch elements.

6. A clutch assembly comprising a frame structure, two axially aligned shafts having journaled relation to said frame structure and having their adjacent ends presented to each other, a rigid clutch element mounted on one of the shafts and having a pair of axially and oppositely facing friction surfaces for clutch engagement, and a rigid clutch element mounted on the other shaft and having mounted thereon a pair of fluid-distensible elements oppositely distensible, axially of the assembly, for effecting driving engagement of said friction surfaces, the assembly including a thrust-bearing assembly interposed operatively between the frame structure and the shaft of one of the rigid clutch elements, and means for making the thrust-bearing ineffective, to permit the frame structure and the shaft to assume relative positions determined by the engagement pressures of the said fluid-distensible elements, and for then making it effective to fix a determinate relationship of the fluid-distensible elements to the friction surfaces.

THOMAS L. FAWICK.

REFERENCES CITED

The following references are of record in the file of this patent:

UNITED STATES PATENTS

| Number | Name | Date |
|---|---|---|
| 1,338,252 | Ralls | Apr. 27, 1920 |
| 1,402,458 | Strom | Jan. 3, 1922 |
| 2,111,847 | Eason | Mar. 28, 1938 |
| 2,208,865 | Gette | July 23, 1940 |
| 2,251,445 | Fawick | Aug. 5, 1941 |
| 2,333,682 | Schneider | Nov. 9, 1943 |
| 2,439,849 | Fawick | Apr. 20, 1948 |
| 2,544,768 | Schulder | Mar. 13, 1951 |